united States Patent [19]
Shirai

[11] Patent Number: 4,786,565
[45] Date of Patent: Nov. 22, 1988

[54] HIGHLY WEATHER-RESISTANT ELECTRODEPOSITION COATING COMPOSITION

[75] Inventor: Shinji Shirai, Tokyo, Japan

[73] Assignees: Yoshida Kogyo K.K., Tokyo; Kansai Paint Co., Ltd., Amagasaki, both of Japan

[21] Appl. No.: 63,705

[22] Filed: Jun. 19, 1987

Related U.S. Application Data

[63] Continuation of Ser. No. 784,091, Oct. 4, 1985, abandoned.

[30] Foreign Application Priority Data

Oct. 6, 1984 [JP] Japan .............................. 59-209040

[51] Int. Cl.$^4$ .................. C08L 27/14; C08L 27/16; C08L 27/22; C08L 33/02
[52] U.S. Cl. .................................. 428/421; 524/376; 524/391; 524/520; 525/200; 525/199; 525/194; 525/192; 525/129; 525/124
[58] Field of Search ................ 428/421; 525/192, 194, 525/199

[56] References Cited

U.S. PATENT DOCUMENTS

| 3,941,860 | 3/1976 | Couchoud et al. | 525/199 |
| 3,944,689 | 3/1976 | Luckock et al. | 427/385 |
| 4,022,737 | 5/1977 | Sekmakas et al. | 260/29.4 |
| 4,039,634 | 8/1977 | Couchoud | 525/199 |
| 4,045,402 | 8/1977 | Bjerk et al. | 525/199 |
| 4,383,075 | 5/1983 | Abel | 524/512 |
| 4,557,977 | 12/1985 | Memmer et al. | 525/199 |

FOREIGN PATENT DOCUMENTS

| 0057813 | 8/1982 | European Pat. Off. |
| 0114909 | 8/1984 | European Pat. Off. |
| 788560 | 1/1958 | United Kingdom . |
| 1333465 | 10/1973 | United Kingdom . |
| 2095265 | 9/1982 | United Kingdom . |

Primary Examiner—Carman J. Seccuro
Attorney, Agent, or Firm—Cushman, Darby & Cushman

[57] ABSTRACT

Disclosed is a highly weather-resistant electrodeposition coating composition which is obtained by neutralizing a mixture of an acrylic polycarboxylic resin having an acid value of from 30 to 100 and fluorocarbon polymers with ammonia or an organic amine, melting point of said fluorocarbon polymers being not higher than a heating temperature for curing a film formed from the electrodeposition coating composition, and which is preferably applied to aluminum building materials.

10 Claims, No Drawings

HIGHLY WEATHER-RESISTANT ELECTRODEPOSITION COATING COMPOSITION

This is a continuation of application Ser. No. 784,091, filed Oct. 4, 1985, now abandoned.

BACKGROUND OF THE INVENTION (1) Field of the Invention

This invention relates to a highly weather-resistant electrodeposition coating composition, and more particularly to a highly weather-resistant electrodeposition coating composition which is capable of imparting an excellent weather resistance to an anodized aluminium or aluminium alloy material (hereinafter simply referred to as an aluminium material) by one electrodeposition coating alone.

(2) Description of the Prior Art

As an example of the electrodeposition coating compositions used for coating the aluminium material, there has been known an acrylic-melamine based water-soluble or water-dispersible coating composition, for example, there is used a water-soluble or water-dispersible coating composition which is obtained by mixing melamine resin as a crosslinking agent with a water-soluble or water-dispersible resin formed by neutralizing a polycarboxylic resin obtained by copolymerization of acrylic acid or methacrylic acid with other acrylic unsaturated monomer and/or ethylenically unsaturated monomer with ammonia or organic amine. The acrylic-melamine based electrodeposition coating composition has widely been used in coating building materials such as an aluminium sash used in the general houses and high buildings due to its good corrosion resistance and weather resistance.

However, although the acrylic-melamine based electrodeposition coating composition exhibits a satisfactory weather resistance when used in the general houses, the electrodeposition coating composition is quite incapable of satisfying recent requirements for durability over a long period of time of several decades when applied to building materials for use in buildings. Accordingly, development of an improved coating composition over the conventional electrodeposition coating composition is highly demanded.

There has heretofore been known a fluorocarbon polymers based coating composition which is capable of forming a film guaranteed for 20 to 30 years as a coating composition to form a highly durable film. The fluorocarbon polymers based coating composition is to be usually coated by coating means such as air spray coating, electrostatic spray coating and roll coating, and is impossible to be uniformly coated on a substrate having complicated shapes such as the aluminium sash, resulting in that a required film thickness is not obtained uniformly, for instance, when applied to an inner portion of a concave surface and in that problems are produced in quality assurance.

SUMMARY OF THE INVENTION

It is an object of this invention to provide a highly weather-resistant electrodeposition coating composition which is capable of assuring high weather resistance over several decades as recently required when applied to building materials for use in buildings, and of being uniformly coated on substrates having complicated shapes. That is, the present invention provides a highly weather-resistant electrodeposition coating composition which is obtained by neutralizing a mixture of an acrylic polycarboxylic resin having an acid value of from 30 to 100 and fluorocarbon polymers with ammonia or an organic amine, melting point of said fluorocarbon polymers being not higher than a heating temperature for curing a film formed from said electrodeposition coating composition.

One of the excellent features of the electrodeposition coating composition in the present invention is in that the electrodeposition coating composition is capable of forming a highly weather-resistant film in one coating. The reason why such an effect is provided is that the fluorocarbon polymers used in combination with the water-soluble or water-dispersible acrylic polycarboxylic resin presents in a suspended state mostly without being dissolved in the aqueous solution, and is subjected to electrodeposition along with the acrylic polycarboxylic resin to form an electrodeposition film, which is cured at a temperature higher than the melting point of the fluorocarbon polymers, resulting in that the acrylic polycarboxylic resin and the fluorocarbon polymers melt uniformly to form a fused film in which both the acrylic polycarboxylic resin and the fluorocarbon polymers are uniformly fused. The resulting fluorocarbon polymers containing electrodeposition coating film has not only such a high weather resistance over seveal decades and chemical resistance as to compete with the conventional fluorocarbon polymers containing coating film, but also is to be uniformly formed even on the substrates having complicated shapes, such as the aluminium sash.

DETAILED DESCRIPTION OF THE PREFERRED EMBODIMENTS

The acrylic polycarboxylic resin used in the present invention is obtained by copolymerizing $\alpha,\beta$-ethylenically unsaturated carboxylic acid with an acrylic monomer such as acrylic alkylester or methacrylic alkylester and an ethylenically unsaturated monomer copolymerizable therewith.

Representative examples of the $\alpha,\beta$-ethylenically unsaturated carboxylic acid include acrylic acid, methacrylic acid, maleic acid, and itaconic acid. Representative examples of the acrylic monomer include acrylic ester monomers such as methyl acrylate, ethyl acrylate, n-propyl acrylate, isopropyl acrylate, n-butyl acrylate, isobutyl acrylate, 2-ethylhexyl acrylate, 2-hydroxyethyl acrylate, 2-hydroxypropyl acrylate and 3-hydroxypropyl acrylate; methacrylic ester monomers such as methyl methacrylate, ethyl methacrylate, n-propyl methacrylate, isopropyl methacrylate, n-butyl methacrylate, isobutyl methacrylate, 2-ethylhexyl methacrylate, lauryl methacrylate, cyclohexyl methacrylate, glycidyl methacrylate, 2-hydroxyethyl methacrylate, 2-hydroxypropyl methacrylate and 3-hydroxypropyl methacrylate; and acrylic amide or methacrylic amide monomers such as acrylamide, N-methylolacrylamide, methacrylamide, N-methylolmethacrylamide, diacetone acrylamide, diacetone methacrylamide and methyloldiacetone acrylamide. Examples of the ethylenically unsaturated monomer include aromatic monomers such as styrene and vinyltoluene, carboxylic vinyl esters such as vinyl acetate and vinyl propionate, and unsaturated nitriles such as acrylonitrile and methacrylonitrile.

It is necessary for the acid value of the acrylic polycarboxylic resin to be in the range of from 30 to 100, preferably 35 to 70, because the acrylic polycarboxylic resin should be such that the mixture of the acrylic polycarboxylic resin with the fluorocarbon polymers is made fully water-soluble or water-dispersible with ammonia or an organic amine. When the acid value of the acrylic polycarboxylic resin is lower than 30, the aqueous solution exhibits a poor dissolved state and has bad stability with time, and the film formed from a coating composition by use of such a resin exhibits poor appearance. On the other hand, when the acid value is higher than 100, weather resistance of the acrylic polycarboxylic resin itself is lowered, appearance, particularly gloss is lowered, co-electrophoretic property of the fluorocarbon polymers and an amino resin used as a crosslinking agent become poor resulting in poor film performance, and compatibility with the fluorocarbon polymers becomes bad, resulting in that cloudiness of the film is remarkably increased.

When the electrodeposition coating composition of the present invention includes amino resin or block polyisocyanate which is used as the crosslinking agent, it is desirable for the acrylic polycarboxylic resin to have hydroxyl group, and hydroxyl group containing acrylic monomers such as 2-hydroxyethyl acrylate, 2-hydroxypropyl acrylate, 2-hydroxyethyl methacrylate and 2-hydroxypropyl methacrylate are used as the acrylic monomer of the acrylic polycarboxylic resin. The hydroxyl number of the acrylic polycarboxylic resin, in which the hydroxyl group containing acrylic monomer is used as the acrylic monomer, is in the range of from 20 to 100, preferably 30 to 80. When the hydroxyl number of the resin is lower than 20, physical properties of the film formed therefrom are poor. On the other hand, when higher than 100, compatibility with the fluorocarbon polymers becomes bad, resulting in that cloudiness of the film is remarkably increased.

The fluorocarbon polymers used in the present invention means homopolymers or copolymers of fluoroolefins such as tetrafluoroethylene, hexafluoropropene, chlorotrifluoroethylene, vinylidene fluoride or vinyl fluoride; copolymers of these fluoroolefins with olefins such as ethylene and propylene and/or fluorovinyl ethers, provided that the copolymer contains at least 50% by weight of fluoroolefin; and the like, and has melting point not higher than a heating temperature for curing a film formed from the electrodeposition coating composition in the present invention. Specific examples of the fluorocarbon polymers include polytetrafluoroethylene, polychlorotrifluoroethylene, polyvinylidene fluoride, polyvinyl fluoride, tetrafluoroethylene-hexafluoropropene copolymer, ethylene-chlorotrifluoroethylene copolymer, tetrafluoroethylene-fluorovinyl ether copolymer, ethylenetetrafluoroethylene-fluorovinyl ether terpolymer, and the like, polyvinylidene fluoride being preferred.

It is not necessary for the fluorocarbon polymers to be uniformly dissolved in the aqueous system, so long as the fluorocarbon polymers is capable of forming a suspension therein. The particle diameter of the fluorocarbon polymers used is in the range of from 0.1 to 50 millimicron (m$\mu$). A dispersion of the fluorocarbon polymers, which is prepared by normal emulsion polymerization, contains the fluorocarbon polymers having a particle diameter of from about 0.1 to 3.0 micrometer, and may be preferably used in the coating composition of the present invention as it is.

The melting point of the fluorocarbon polymers used in the present invention must be not higher than a heating temperature for curing a film formed from the electrodepositon coating composition in the present invention, preferably not higher than 200° C., whereby the acrylic polycarboxylic resin-fluorocarbon polymers film is formed in such a state that while the film of the coating composition of the present invention is heated for curing, the fluorocarbon polymers is partly melted or softened to be uniformly distributed into the film. When the melting point of the fluorocarbon polymers is higher than the heating temperature for curing, any film with uniform distribution is not obtained to form a film in which the fluorocarbon polymers is isolated, resulting in that good durability of the fluorocarbon polymers is not fully exhibited.

The mixing ratio of the acrylic polycarboxylic resin to the fluorocarbon polymers is such that the former is in the range of from 20 to 90% by weight, preferably 30 to 80% by weight, while the latter is in the range of from 10 to 80% by weight, preferably 20 to 70% by weight. When the amount to be used of the acrylic polycarboxylic resin is less than 20% by weight, or the amount to be used of the fluorocarbon polymers is more than 80% by weight, preparation of uniform and stable electrodeposition bath is made difficult.

On the other hand, when the amount to be used of the acrylic polycarboxylic resin is more than 90% by weight, or the amount to be used of the fluorocarbon polymers is less than 10% by weight, the highly weather-resistant electrodeposition coating composition according to the present invention is not obtained.

As required, conventionally known amino resin and block polyisocyanate are used as the crosslinking agent in the electrodeposition coating composition of the present invention. Adducts with formaldehyde of melamine, urea, benzoguanamine, acetoguanamine or mixtures thereof, and alcohol etherified compounds thereof are used as the amino resin, which is not required to be water-soluble.

The block polyisocyanate is prepared by reacting polyisocyanate compound with a blocking agent such as alcohol and phenol. Examples of the polyisocyanate compound include tolylene diisocyanate, 4,4'-diphenylmethane diisocyanate, xylylene diisocyanate, methaxylylene diisocyanate, hexamethylene diisocyanate, lysine diisocyanate, 4,4'-methylene bis (cyclohexylisocyanate), methylcyclohexane 2,4(2,6) diisocyanate, 1,3-(isocyanate methyl) cyclohexane, isophorone diisocyanate, trimethylhexamethylene diisocyanate, and the like.

The amino resin and the block polyisocyanate may be used along or in combination. They may be used in an amount not more than 10% by weight of the electrodeposition coating composition of the present invention.

Examples of ammonia and the organic amine used as the neutralizing agent for making water-soluble in the present invention include ammonia, dimethylamine, trimethylamine, diethylamine, triethylamine, diisopropylamine, butylamine, monoethanolamine, diethanolamine, triethanolamine, monoisopropanolamine, diisopropanolamine, triisopropanolamine, N-methylethanolamine, N-aminoethylethanolamine, N-methyldiethanolamine and polyglycolamine. These neutralizing agents are used in an amount of from 0.3 to 1.2 equivalents with respect to carboxyl group in the acrylic polycarboxylic resin.

The electrodepositon coating composition of the present invention is liable to form a film with cloudiness because of containing the fluorocarbon polymers originally having bad compatibility as a binder component with the result that the cloudiness gives no adverse influence on the weather resistance and chemical resistance of the film. However, when a transparent film free from cloudiness is required, a transparent film may be formed by maintaining the acid value and the hydroxyl number of the acrylic polycarboxylic resin as low as possible within the aforesaid range and by lowering the value of the solubility parameter thereof to improve compatibility with the fluorocarbon polymers.

Water miscible organic solvents are used in the electrodeposition coating composition of the present invention in order to aid to make the acrylic polycarboxylic resin water-soluble or dispersible. Examples of the water miscible organic solvent include alcohols such as methyl alcohol, ethyl alcohol, isopropyl alcohol and butyl alcohol; cellosolve type solvents such as ethylene glycol monomethyl ether, ethylene glycol monoethyl ether and ethylene glycol monobutyl ether; propylene glycol ethers, ethylene glycol ethers, and the like.

As required, conventionally used additives such as surface active agents, pigments and crosslinking accelerator may be incorporated in the electrodeposition coating composition.

The conventional electrodeposition process may be applied to the coating composition of the present invention, and the electrodeposition may be carried out, for example, under the conditions of a bath temperature of from 15° to 35° C., a bath concentration of from 4 to 15% by weight and a coating voltage of from 80 to 350 V.

Metals such as iron, copper and aluminium may be used as the substrate to be coated, and the aluminium materials such as plates, bars, tubes or other articles with complicated shapes of the anodized aluminium, to which the electrodeposition coating composition of the present invention is particularly effective, are preferred.

The present invention will be explained more in detail by the following Examples and Comparative Examples, in which parts and % are all by weight.

PREPARATION EXAMPLES OF ACRYLIC POLYCARBOXYLIC RESINS

PREPARATION EXAMPLE 1

Fifty parts of butylcellosolve is charged into a reactor and heated at 90° C. A mixture of 45 parts of methylmethacrylate, 37 parts of n-butylacrylate, 10 parts of hydroxyethylmethacrylate, 8 parts of acrylic acid and 2 (two) parts of azobisisobutyronitrile is dropped thereinto over 3 hours. After the completion of the dropping procedure, heating with agitation is further continued for polymerization. A solids concentration of an acrylic polycarboxylic resin solution thus obtained is 67%, and an acid value of the resin is 65.

PREPARATION EXAMPLE 2

An acrylic polycarboxylic resin solution is prepared in the same manner as in Preparation Example 1 except that 42 parts of n-butylacrylate and 3 parts of acrylic acid are used. A solids concentration of an acrylic polycarboxylic resin solution obtained is 67%, and an acid value of the resin is 23.

PREPARATION EXAMPLE 3

An acrylic polycarboxylic resin solution is prepared in the same manner as in Preparation Example 1 except that 32 parts of n-butylacrylate and 13 parts of acrylic acid are used. A solids concentration of the acrylic polycarboxylic resin solution is 67%, and an acid value of the resin is 105.

EXAMPLE 1

To a ball mill are charged 15 parts of the acrylic polycarboxylic resin solution in Preparation Example 1, 10 parts of diethylene glycol monobutyl ether, 10 parts of isopropyl alcohol and 40 parts of Kynar V500 (vinylidene polyfluoride resin, Trade Name, marketed by Pennwalt Corp., U.S.A.) to be subjected to dispersion for 20 hours. To a dispersion thus obtained are added 1.0 part of triethylamine and 424 parts of deionized water to be dispersed with agitation and to obtain a water-soluble coating composition having a solids concentration of 10%.

EXAMPLES 2–5 AND COMPARATIVE EXAMPLES 1–3

Water-soluble coating compositions having a solids concentration of 10% are prepared in the same manner as in Example 1 according to formulations shown in Table-1.

Anodized aluminium plates (anodized film thickness: 10μ) are immersed in water-soluble coating composition baths obtained in the above Examples and Comparative Examples, electrodeposition coating is carried out for 3 minutes under the conditions shown in Table-1, the anodized aluminium plates being used as the anode. Coated anodized aluminium plates obtained and having a film thickness of from 10 to 15μ are washed with water and cured at 200° C. for 30 minutes. Results of film performance tests are shown in Table-1.

TABLE 1

|  | Example | | | | | Comparative Example | | |
| --- | --- | --- | --- | --- | --- | --- | --- | --- |
|  | 1 | 2 | 3 | 4 | 5 | 1 | 2 | 3 |
| Resin in Preparation Example 1 | 15 | 30 | 52.5 | 30 | 30 | 67.5 | | |
| Resin in Preparation Example 2 | | | | | | | 30 | |
| Resin in Preparation Example 3 | | | | | | | | 30 |
| Kynar V500 *1 | 40 | 30 | 15 | 30 | 30 | 5 | 30 | 30 |
| Diethylene glycol monobutyl ether | 10 | 7.5 | 3.75 | 7.5 | 7.5 | | 7.5 | 7.5 |
| Isopropyl alcohol | 10 | 7.5 | 3.75 | 7.5 | 7.5 | | 7.5 | 7.5 |
| Triethyl amine | 1.0 | 2.0 | 3.5 | 2.0 | 2.0 | 4.5 | 0.7 | 3.2 |
| Water | 424 | 423 | 421.5 | 421 | 421 | 424.3 | 424.3 | 421.8 |
| Melamine resin *2 | | | | 2 | | | | |
| Block isocyanate *3 | | | | | 2 | | | |
| Coating voltage (V) | 60 | 100 | 150 | 80 | 80 | 180 | 100 | 150 |
| States of film (Determination | delustered, good | delustered, good | half-delustered, good | delustered, good | delustered, good | lustered, good | unevenness of | increased cloudiness |

TABLE 1-continued

|  | Example | | | | | Comparative Example | | |
| --- | --- | --- | --- | --- | --- | --- | --- | --- |
|  | 1 | 2 | 3 | 4 | 5 | 1 | 2 | 3 |
| by the naked eye) |  |  | good |  |  |  | deposition |  |
| Adhesion properties *4 | good | good | good | good | good | good | good | good |
| Gloss retension (%) *5 | 85 | 65 | 60 | 70 | 73 | 10> | — | 65 |

*1: Polyvinylidene fluoride resin
*2: Nikalac MX-40 (partially butoxyfied methyl-aminotriazine, marketed by Sanwa Chemicals Co., Ltd.)
*3: Butylcellosolve blocked compound of isophorone diisocyanate
*4: Adhesion test with squares
*5: Gloss retension after 5,000 hours exposure to Sunshine Weather-o-meter

What is claimed is:

1. A highly weather-resistant electrodeposition coating composition obtained by:
   dispersing a mixture of 20 to 90% by weight of an acrylic polycarboxylic resin prepared by copolymerizing an $\alpha,\beta$-ethylenically unsaturated carboxylic acid with at least one acrylic monomer, at least one of which having hydroxyl groups, and an ethylenically unsaturated monomer copolymerizable therewith, said acrylic polycarboxylic resin having an acid value of from 30 to 100 and a hydroxyl number of from 20 to 100,
   with 10 to 80% by weight of fluorocarbon polymer, which is a homopolymer or a copolymer of fluoroolefins and has a particle diameter of from 0.1 to 50 m$\mu$ and a melting point not higher than a heating temperature for curing a film formed from said electrodeposition coating compositions,
   in the presence of at least one water miscible organic solvent selected from the group consisting of alcohols and cellosolve-type solvents, to form a dispersion,
   followed by neutralizing the dispersion with a neutralizing agent selected for the group consisting of ammonia, dimethylamine, trimethylamine, diethylamine, triethylamine, diisopropylamine, butylamine, monoethanolamine, diethanolamine, triethanolamine, monoisopropanolamine, diisopropanolamine, triisopropanolamine, N-methylethylamine, N-aminoethylethanolamine, N-methyldiethanolamine and polyglycolamine, said neutralizing agent being used in an amount of from 0.3 to 1.2 equivalents with respect to the carboxyl groups on the acrylic carboxylic resin,
   and dispersing in water.

2. A coating composition according to claim 1, wherein the melting point of the fluorocarbon polymer is not higher than 200° C.

3. A coating composition according to claim 1, wherein the fluorocarbon polymer is polyvinylidene fluoride.

4. A coating composition according to claim 1, wherein said acrylic monomer having hydroxyl groups is selected from the group consisting of 2-hydroxyethyl acrylate, 2-hydroxypropyl acrylate, 2-hydroxyethyl methacrylate and 2-hydroxypropyl methacrylate.

5. An aluminum sash coated with the composition of claim 1.

6. A coating composition according to claim 1, wherein in said coating composition said organic solvent is selected from the group consisting of methyl alcohol, ethyl alcohol, isopropyl alcohol, butyl alcohol, ethylene glycol monomethylether, ethylene glycol monoethylether, ethylene glycol monobutylether, propylene glycol ethers, ethylene glycol ethers.

7. A metal substrate coated with the composition of claim 1 wherein the metal substrate comprises iron, copper or aluminum.

8. A highly weather-resistant electrodeposition coating obtained by:
   dispersing a mixture of 20 to 90% by weight of an acrylic polycarboxylic resin prepared by copolymerizing an $\alpha,\beta$-ethylenically unsaturated carboxylic acid with an acrylic monomer having hydroxyl groups and an ethylenically unsaturated monomer copolymerizable therewith and having an acid value of from 30 to 100 and a hydroxyl number of from 20 to 100,
   with 10 to 80% by weight of fluorocarbon polymer which is a homopolymer or a copolymer of fluoroolefins and has a particle diameter of from 0.1 to 50 m$\mu$ and a melting point not higher than a heating temperature for curing a film formed from said electrodeposition coating composition,
   in the presence of a water miscible organic solvent selected from the group consisting of alcohols and cellosolve-type solvents to form a dispersion,
   followed by neutralizing the dispersion with a neutralizing agent selected from the group consisting of ammonia and aliphatic organic amines and dispersing in water.

9. A coating composition according to claim 8, wherein the fluorocarbon polymer is polyvinylidene fluoride.

10. A coating composition according to claim 8, wherin the hydroxyl group containing acrylic monomer is selected from 2-hydroxyethyl acrylate, 2-hydroxypropyl acrylate, 2-hydroxyethyl methacrylate and 2-hydroxypropyl methacrylate.

* * * * *